United States Patent [19]

Arnold

[11] Patent Number: 4,557,319

[45] Date of Patent: Dec. 10, 1985

[54] MARINE KEEL COOLER

[76] Inventor: Alanson J. Arnold, 16 Bluebird St., New Orelans, La. 70124

[21] Appl. No.: 394,943

[22] Filed: Jul. 2, 1982

[51] Int. Cl.$^4$ .......................... B60H 3/00; B63B 1/34
[52] U.S. Cl. ...................................... 165/44; 165/41; 440/88; 114/67 R
[58] Field of Search ...................... 165/44, 41; 440/88; 114/67 R

[56] References Cited

U.S. PATENT DOCUMENTS

| | | | |
|---|---|---|---|
| 36,808 | 10/1962 | Stevens | 440/88 |
| 257,360 | 5/1982 | Messervey | 165/41 |
| 1,290,112 | 1/1919 | Deckert | 165/174 |
| 1,408,868 | 3/1922 | Dutcher | 114/67 R |
| 2,356,844 | 8/1944 | Higgins | 165/44 |
| 2,382,218 | 8/1945 | Fernstrum | 440/88 |
| 2,415,154 | 2/1947 | Walter | 165/44 |
| 2,914,012 | 11/1959 | Godfrey et al. | 440/88 |
| 3,240,179 | 3/1966 | Van Ranst | 440/88 |
| 3,352,118 | 11/1967 | Burkhardt | 114/67 R |
| 3,841,396 | 6/1973 | Knaebel et al. | 165/44 |
| 4,043,289 | 8/1977 | Walter | 165/44 |

FOREIGN PATENT DOCUMENTS 11379  6/1924  Netherlands .......................... 165/41

*Primary Examiner*—William R. Cline
*Assistant Examiner*—John K. Ford

[57] ABSTRACT

Fore and aft headers are parallely spaced apart and connected by a plurality of tubes or pipes extending normal thereto and forming therewith a grid type heat exchanger. The headers are streamlined and fixed to the bottom of a marine vessel with the tubes spaced outwardly from the vessel's bottom and extending longitudinally therewith. The inboard and outboard sides of the tubes are narrowed to define wider entrances and exits between tubes than the spaces between adjacent sides of the tubes intermediate the inboard and outboard sides. The streamlined headers reduce flat plate resistance and resistance due to turbulent water flow to promote laminar water flow therebetween from forward to aft. The widened entrances and exits between tube tops and bottoms accelerates water flow up, around and between tubes by eliminating the "vena contracta" and increasing the flow around adjacent tube sides, thus increasing the rate of cooling of a coolant from an interior heat source. The flow of coolant from a heat source to the heat exchanger is to the after header, through the longitudinal tubes to the forward header and back to the heat source, the coolant always flowing oppositely to the cooling water flow and further increasing the cooling efficiency of the invention.

1 Claim, 4 Drawing Figures

MARINE KEEL COOLER

CROSS REFERENCE TO RELATED APPLICATIONS

This is a substitute for prior patent application for a Marine Keel Cooler, Ser. No. 889,773, filed Mar. 24, 1978, now abandonded.

BACKGROUND OF THE INVENTION

The invention relates generally to heat exchangers, and more particularly to marine keel coolers.

Keel coolers are well known in the prior art as disclosed by Higgins, U.S. Pat. No. 2,356,844; Walter, U.S. Pat. No. 4,043,289; Deckert, U.S. Pat. No. 1,290,112; and Knaebel, U.S. Pat. No. 3,841,396. Higgins teaches a Heat Dissipator for Marine Engines with round tubes circulating a coolant in both fore and aft directions between headers spaced both longitudinally and vertically apart. Each of the two headers is divided into two compartments which are connected by a small bleeder passage to prevent steam locks therein from stopping the circulation of the coolant through the tubes. Walter teaches an odd number of round and fluted tubes, one of which is longitudinally divided to provide an even number of passages in any combination of odd numbered tubes for providing for the circulation of coolant in both fore and aft directions, but having only one combination coolant entrance and exit. Deckert teaches a water heater having a plurality of oval tubes arranged radially in an inner casting sheel and extending longitudinally fore and aft therein. The oval tubes are unequally curved at the respective in and outboard sides with the widest curves coinciding with the widest tube spacing at the outboard sides for radial flow of a heating fluid around the tubes increased only at the narrow inboard tube sides. Knaebel teaches a finned heat exchanger for increasing and thinning heat transfer surfaces as in the fluting of Walter.

The invention differs from all of these and teaches an improved cooling in a keel cooler by a combination of both increasing the flow of cooling sea water between the tubes and the tube area where such flow occurs, by providing that the flow in the tubes are around the tubes is always in opposite directions, and by eliminating the vena contracta area between equally spaced apart tubes.

SUMMARY OF THE INVENTION

It is an object of the invention to provide a keel cooler for marine vessels in which heat transfer is maximized by increasing the flow of cooling sea water between tubes carrying a heated coolant by shaping and positioning said tubes relative to each other and the bottom of the vessel, by shaping headers to reduce flat plate resistance and flow turbulence, by eliminating vena contracta areas adjacent tops and bottoms sides of said tubes, and by flowing cooling sea water and heated coolant oppositely over the heat transfer surfaces.

DETAILED DESCRIPTION OF THE INVENTION

Figure 1:
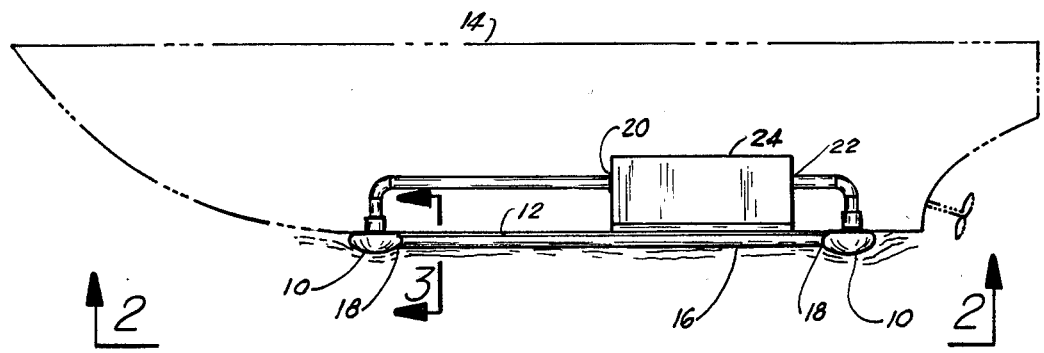
FIG. 1 is a side elevation of the invention showing installation if a marine vessel.
Figure 2:
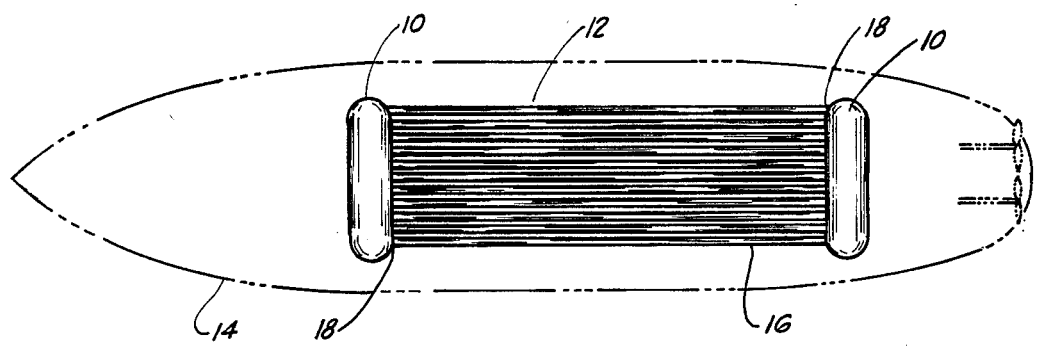
FIG. 2 is a bottom view of the matter in FIG. 1.
Figure 3:
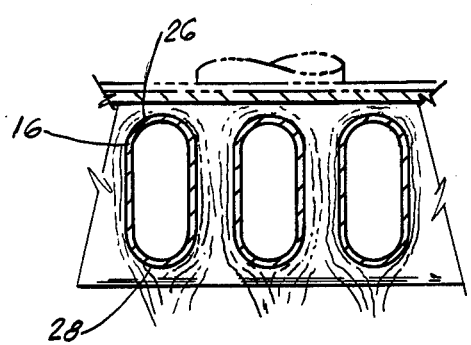
FIG. 3 is a cross-sectional view taken along section lines 3—3 of FIG. 1.

The invention comprises a pair of headers 10 tranversely fixed to the bottom 12 of a marine vessel 14. The headers are spaced longitudinally fore and aft and parallel to each other. Tubes 16 are connected normal to the headers by oppositely dispose tube ends 18, and are thus parallel to each other also. Input and output ends 20 and 22 of a coolant water jacket 24 are respectively connected through bottom 12 to opposite headers 10 to provide a closed circulation of coolant through said output end 22 to after header 10, tubes 16, forward header 10, coolant jacket input end 20, and through coolant jacket and so on in continuous circulation opposite to the flow of the sea water around the tubes.

The streamlined headers 10 reduce flat plate resistance, direct a laminar flow of water upward and aft, with little or no turbulence, around tubes 16 and beyond.

Figure 4:
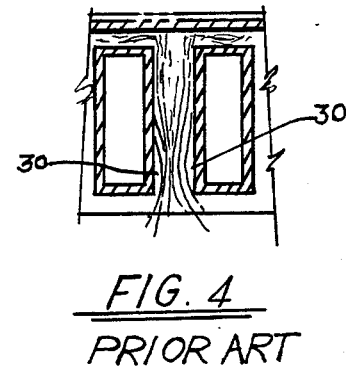
FIG. 4 is a cross-sectional view similar to FIG. 3 showing the area of vena contracta in a conventional keel cooler.

Tubes 16 are vertically spaced below bottom 12 and are equally rounded at the respective top and bottom sides 26 and 28 to space these sides more widely than the adjacent sides 30 therebetween are spaced apart, thereby accelerating the flow of sea water between and around the tubes, eliminating area of vena contracts 32 (see FIG. 4), and reducing turbulence of longitudinal sea water flow. Adjacent sides 30 are elongated giving the tubes a cross-section of a generally oval shape to increase the area of heat transfer surfaces to the accelerated cooling flow.

It is understood that coolant jacket 24 can be that of any shipboard heat source, such as an engine, condenser, or the like.

What is claimed is:

1. A marine keel cooler for cooling an operationally heated coolant of a marine vessel cooling jacket, having oppositely disposed cool input and hot output ends, comprising:
   (a) a pair of parallel header means mounted transversely with respect to the keel and longitudinally spaced apart fore and aft on the exterior surface of the marine vessel bottom, and respectively connected through said bottom to said cool input and hot output ends of said cooling jacket, each of said header means having fore and aft edges adjacent said marine vessel bottom and a downwardly curved outer surface between said edges, for producing, as said vessel moves through the sea water in which it floats, a smooth laminar flow of said sea water over the outer surface of said header means; and
   (b) a plurality of straight parallel coolant tube means spaced transversely apart from one another and from said vessel bottom having oppositely disposed ends, each of said tube means having upper rounded and lower rounded parallel sides and substantially planar parallel elongated right and left sides, defining a tube cross-section of a generally elongated oval shape, said oppositely disposed ends of said tube means being connected between said pair of header means to define a closed path for heated coolant through said tubes means, header means and said cooling jacket, said upper rounded and lower rounded parallel sides of adjacent tube means eliminating areas of vena contracta between said spaced apart tube means and said elongated right and left sides of adjacent tube means defining therebetween a channel through which sea water flows with increased velocity by the venturi effect for effecting maximum heat transfer from said operationally heated coolant circulated through said header and tube means, and said curved outer surface of said forward header means acting to direct sea water upwardly and obliquely through said channels between said tube means as the vessel moves forward through the sea water.

* * * * *